(12) United States Patent
Haft et al.

(10) Patent No.: US 9,938,910 B2
(45) Date of Patent: Apr. 10, 2018

(54) MODELING OIL DILUTION USING A MULTICOMPONENT MODEL

(71) Applicant: Continental Automotive GmbH, Hannover (DE)

(72) Inventors: Gerhard Haft, Lappersdorf (DE); Jan-Richard Lenk, Regensburg (DE); Paul Rodatz, Landshut (DE); Sebastian Viehoever, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 198 days.

(21) Appl. No.: 14/435,791

(22) PCT Filed: Oct. 10, 2013

(86) PCT No.: PCT/EP2013/071200
§ 371 (c)(1),
(2) Date: Apr. 15, 2015

(87) PCT Pub. No.: WO2014/060291
PCT Pub. Date: Apr. 24, 2014

(65) Prior Publication Data
US 2015/0292418 A1    Oct. 15, 2015

(30) Foreign Application Priority Data

Oct. 15, 2012 (DE) .......... 10 2012 218 775
Nov. 23, 2012 (DE) .......... 10 2012 221 507

(51) Int. Cl.
*F02D 19/06* (2006.01)
*F02D 19/08* (2006.01)
(Continued)

(52) U.S. Cl.
CPC ......... *F02D 19/088* (2013.01); *F02D 19/084* (2013.01); *F02D 19/085* (2013.01);
(Continued)

(58) Field of Classification Search
CPC ......... F01M 2001/165; F01M 2011/14; F01M 2011/148; F01M 5/04; F02D 2250/11; F02D 19/084; F02D 19/087; F02D 19/088
(Continued)

(56) References Cited

U.S. PATENT DOCUMENTS 6,966,304 B2 * 11/2005 Nagaishi ............ F02D 35/025
                                                    123/196 R
7,168,408 B2    1/2007 Toda .................... 123/196 S
(Continued)

FOREIGN PATENT DOCUMENTS

CN    101155984 A    4/2008 ............ F01M 11/12
CN    101299038 A    11/2008 ............ F01M 11/10
(Continued)

OTHER PUBLICATIONS

Chinese Office Action, Application No. 201380053872.8, 13 pages, dated Aug. 9, 2016.
(Continued)

*Primary Examiner* — Hung Q Nguyen
*Assistant Examiner* — Kevin R Steckbauer
(74) *Attorney, Agent, or Firm* — Slayden Grubert Beard PLLC

(57) ABSTRACT

A method for determining the composition of a fuel in a lubricant in an internal combustion engine in disclosed. The composition of a fuel having at least a first portion of a first fuel component and a second portion of a second fuel component is predefined. The mass flow with which the fuel is introduced into the lubricant in an introduction phase or discharged from the lubricant and from the housing in a discharge phase is determined. The composition of the mass flow is determined from a first mass flow of the first fuel component and a second mass flow of the second fuel component (Continued)

component, which are determined based on a) an introduction parameter in the introduction phase or a discharge parameter in the discharge phase, and b) the first portion of the first fuel component and the second portion of the second fuel component in the fuel.

14 Claims, 1 Drawing Sheet

(51) Int. Cl.
 F02D 41/00 (2006.01)
 F01M 11/10 (2006.01)
 F01M 1/16 (2006.01)
 F02D 41/04 (2006.01)
(52) U.S. Cl.
 CPC ....... *F02D 19/087* (2013.01); *F02D 41/0025* (2013.01); *F01M 11/10* (2013.01); *F01M 2001/165* (2013.01); *F02D 19/0607* (2013.01); *F02D 41/047* (2013.01); *F02D 2200/021* (2013.01); *F02D 2200/023* (2013.01); *F02D 2200/0606* (2013.01); *F02D 2200/0611* (2013.01); *F02D 2200/0612* (2013.01); *F02D 2200/0614* (2013.01); *F02D 2250/11* (2013.01); *Y02T 10/36* (2013.01)
(58) Field of Classification Search
 USPC ..................................................... 73/114.55
 See application file for complete search history.

(56) References Cited

U.S. PATENT DOCUMENTS

| | | | | |
|---|---|---|---|---|
| 7,311,094 B2 * | 12/2007 | Mallebrein | ............ | F02D 19/12 123/572 |
| 7,406,947 B2 * | 8/2008 | Lewis | .................... | F02B 63/02 123/1 A |
| 7,433,776 B1 | 10/2008 | Hunter et al. | ................ | 701/102 |
| 7,694,666 B2 * | 4/2010 | Lewis | ................ | F02M 25/0227 123/1 A |
| 7,971,575 B2 * | 7/2011 | Lewis | ................ | F02M 25/0227 123/1 A |
| 8,046,153 B2 * | 10/2011 | Kurtz | .................... | F01N 9/002 123/1 A |
| 8,113,186 B2 * | 2/2012 | Tsunooka | ............ | F02D 41/0025 123/520 |
| 8,286,472 B2 * | 10/2012 | Katsurahara | ............ | F01L 1/344 73/114.79 |
| 8,862,316 B2 * | 10/2014 | Protin | ................ | F02D 41/0025 701/29.1 |
| 9,234,477 B2 * | 1/2016 | Lunati | ................ | F02D 19/0628 |
| 9,482,174 B2 * | 11/2016 | DeAngelis | ............. | F02D 41/40 |
| 9,506,412 B2 * | 11/2016 | Tsukagoshi | ........... | F02D 41/123 |
| 2004/0099252 A1 * | 5/2004 | Nagaishi | ................ | F02D 35/025 123/480 |
| 2006/0201487 A1 * | 9/2006 | Mallebrein | ............. | F02D 19/12 123/478 |
| 2007/0119425 A1 * | 5/2007 | Lewis | .................... | F02B 63/02 123/478 |
| 2008/0283023 A1 * | 11/2008 | Lewis | .................... | F02B 63/02 123/344 |
| 2010/0083937 A1 * | 4/2010 | Tsunooka | ............ | F02D 41/0025 123/435 |
| 2010/0192905 A1 * | 8/2010 | Lewis | .................... | F02B 63/02 123/299 |
| 2010/0300189 A1 * | 12/2010 | Katsurahara | ............ | F01L 1/344 73/114.79 |
| 2011/0166767 A1 * | 7/2011 | Kurtz | .................... | F01N 9/002 701/103 |
| 2012/0226425 A1 * | 9/2012 | Lunati | ................ | F02D 19/0628 701/102 |
| 2012/0232748 A1 * | 9/2012 | Protin | ................ | F02D 41/0025 701/34.4 |
| 2012/0310514 A1 | 12/2012 | Viehöver et al. | ............. | 701/112 |
| 2014/0303875 A1 * | 10/2014 | Tsukagoshi | ........... | F02D 41/123 701/104 |
| 2015/0204263 A1 * | 7/2015 | DeAngelis | ............. | F02D 41/40 123/478 |

FOREIGN PATENT DOCUMENTS

| | | | | |
|---|---|---|---|---|
| DE | 10222808 A1 * | 11/2003 | ........... | F02D 41/003 |
| DE | 102004008891 A1 | 9/2005 | ............. | F02D 19/12 |
| DE | 102010006580 B3 | 7/2011 | ............. | F02D 41/00 |
| EP | 2472088 A1 | 7/2012 | ............. | F02D 41/02 |
| JP | 2008267196 A | 11/2008 | ............. | F01M 11/10 |
| WO | 2009/068770 A1 | 6/2009 | ............. | F02D 41/00 |
| WO | 2014/060291 A1 | 4/2014 | ............. | F02D 41/04 |

OTHER PUBLICATIONS

International Search Report and Written Opinion, Application No. PCT/EP2013/071200, 18 pages, dated Mar. 5, 2014.

* cited by examiner

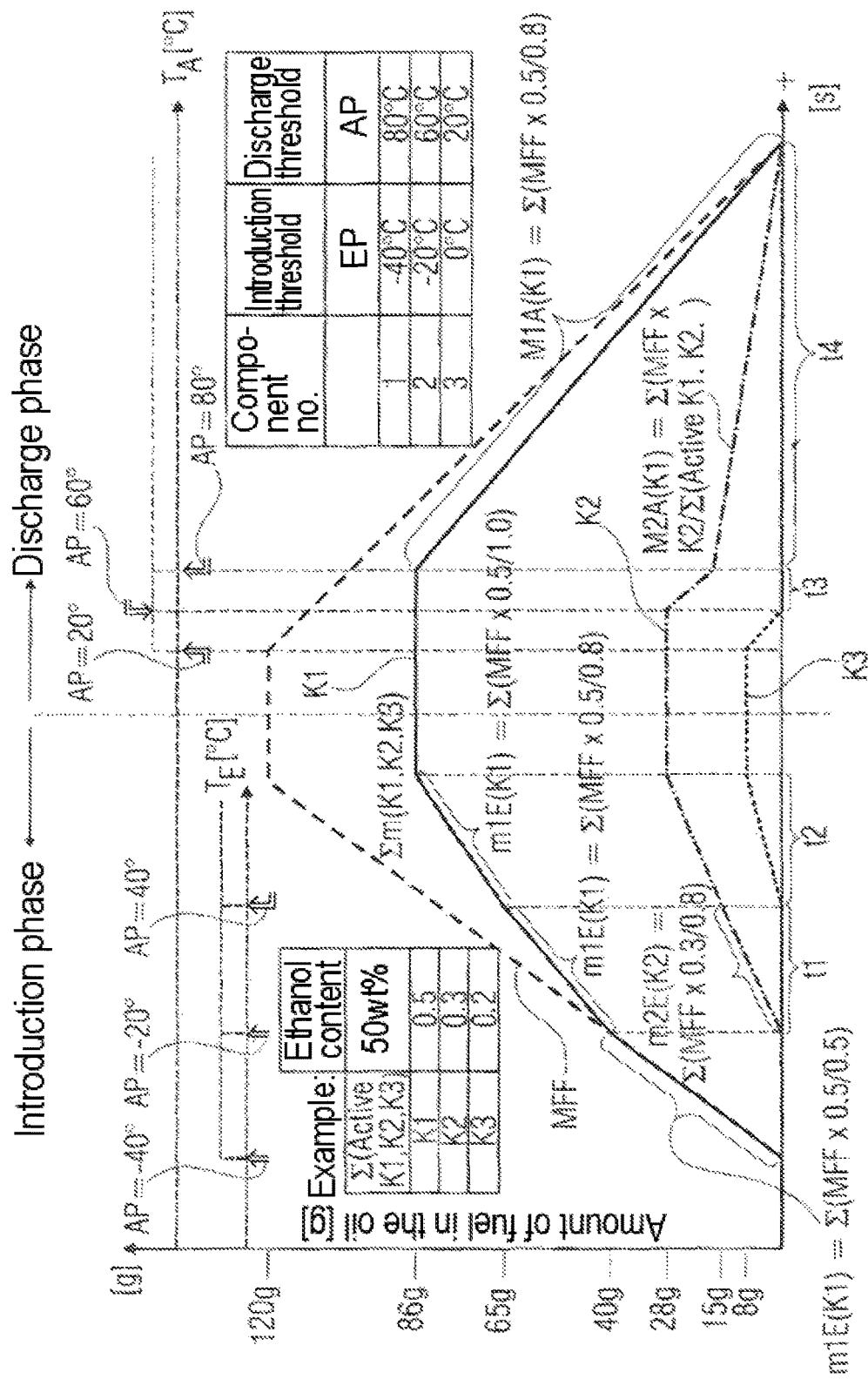

MODELING OIL DILUTION USING A MULTICOMPONENT MODEL

CROSS-REFERENCE TO RELATED APPLICATIONS

This application is a U.S. National Stage Application of International Application No. PCT/EP2013/071200 filed Oct. 10, 2013, which designates the United States of America, and claims priority to DE Application No. 10 2012 218 775.8 filed Oct. 15, 2012 and DE Application No. 10 2012 221 507.7 filed Nov. 23, 2012, the contents of which are hereby incorporated by reference in their entirety.

TECHNICAL FIELD

The present invention relates to a method for determining a composition of a fuel in a lubricant situated in a housing of an internal combustion engine. The present invention also relates to a method for operating an internal combustion engine, and to a control device for an internal combustion engine of a motor vehicle.

BACKGROUND

Modern Otto-cycle engines, in particular so-called Flex-Fuel engines, which can be operated with any desired fuel composition of gasoline and ethanol, exhibit increased introduction of fuel into the oil circuit of the Otto-cycle engine. This introduction of fuel has an adverse effect on the lubricating action of the engine oil. In particular, the subsequent outgassing of the fuel from the engine oil poses an acute risk to fault-free engine running. It is thus sought, in terms of hardware, to discharge the fuel again as quickly as possible. In terms of software, a fuel content of the engine oil is modeled. If one additionally takes into consideration systems of the Otto-cycle engine which must process a wide variety of fuels (for example fuels with different ethanol/water contents), the modeling of the introduction and discharge behavior becomes significantly more complex.

Correct introduction and discharge behavior for different fuels must be determined over the lifetime of the vehicle. Furthermore, the mixture of the different fuels must be taken into consideration. Only in this way is it possible to ensure correct system intervention or correct handling of a certain level of oil dilution and fuel outgassing.

Normally, the oil dilution and the fuel outgassing are determined by way of simple models which operate based on a lambda controller or which merely count the number of cold starts, with the oil dilution being inferred based on said number.

SUMMARY

One embodiment provides a method for determining a composition of a fuel in a lubricant situated in a housing of an internal combustion engine, the method comprising predefining a composition of a fuel which has at least a first fraction of a first fuel component and a second fraction of a second fuel component, determining a mass flow of the fuel, with which mass flow the fuel is introduced into the lubricant in an introduction phase or with which mass flow the fuel is discharged from the lubricant in a discharge phase, determining the composition of the mass flow which is made up of a first mass flow of the first fuel component and of a second mass flow of the second fuel component, wherein a first mass flow fraction of the first mass flow of the first fuel component and a second mass flow fraction of the second mass flow of the second fuel component is determined based on a) an introduction parameter in the introduction phase or a discharge parameter in the discharge phase, and b) the first fraction of the first fuel component and the second fraction of the second fuel component in the fuel.

In a further embodiment, the determination of the mass flow of the fuel into the lubricant or out of the lubricant has the steps: determining a stoichiometric fuel ratio of the fuel, determining a fuel mass of the fuel injected into the internal combustion engine, and comparing the stoichiometric fuel ratio of the fuel with the injected fuel mass, such that the mass flow into the lubricant or out of the lubricant can be determined from these.

In a further embodiment, the introduction parameter is a temperature of a coolant of the internal combustion engine or a fuel temperature of the fuel.

In a further embodiment, the method further includes selecting a further introduction parameter, wherein, based on the introduction parameter and the further introduction parameter, a first introduction mass flow of the first fuel component and a second introduction mass flow of the second fuel component into the lubricant can be determined.

In a further embodiment, the discharge parameter is the temperature of the lubricant.

In a further embodiment, the method further includes selecting a further discharge parameter, wherein, based on the discharge parameter and the further discharge parameter, a first discharge mass flow of the first fuel component and a second discharge mass flow of the second fuel component out of the lubricant can be determined.

In a further embodiment, at least the first fraction of the first fuel component or the second fraction of the second fuel component defines an ethanol content of the fuel, a water content of the fuel, a toluene content of the fuel, a 2-methylpropan-1-ol content of the fuel, a tert-butyl methyl ether content of the fuel, an isopentane content of the fuel and/or a methanol content of the fuel, wherein the first fraction of the fuel differs from the second fraction of the fuel.

Another embodiment provides a method for operating an internal combustion engine, including performing the method disclosed above, and setting a fuel/air mixture in an intake tract of the internal combustion engine based on the mass flow of the fuel, wherein, in the setting of the fuel/air mixture in the intake tract, the composition of the mass flow is taken into consideration.

Another embodiment provides a control device for an internal combustion engine of a motor vehicle, wherein the control device is configured to perform any of the methods disclosed above.

Another embodiment provides a computer program for determining a total mass of a fuel in a lubricant, which computer program is stored in non-transitory computer-readable media and executable by a processor to perform any of the methods disclosed above.

BRIEF DESCRIPTION OF THE DRAWINGS

FIG. 1 shows a diagram relating to the determination of the introduction and discharge of three fuel components into and out of a lubricant, according to an example embodiment of the present invention.

DETAILED DESCRIPTION

Embodiments of the present invention detect dilution of a lubricant based on an introduction of fuel.

More particular, embodiments of the present invention provide a method for determining a composition of a fuel in the lubricant, a method for operating an internal combustion engine, and a control device for operating an internal combustion engine for a motor vehicle.

Some embodiments provide a method is proposed for determining a composition of a fuel in a lubricant situated in a housing of an internal combustion engine. A composition of a fuel which has at least a first fraction of a first fuel component and a second fraction of a second fuel component is determined. Furthermore, a mass flow of the fuel is determined, with which mass flow the fuel is introduced into the lubricant in an introduction phase or with which mass flow the fuel is discharged from the lubricant and from the housing in a discharge phase.

Furthermore, the composition of the mass flow, which is made up of a first mass flow of the first fuel component and of a second mass flow of the second fuel component, is determined. The first mass flow (first introduction mass flow or first discharge mass flow) of the first fuel component and the second mass flow (second introduction mass flow or second discharge mass flow) of the second fuel component is determined based on
  a) an introduction parameter in the introduction phase or a discharge parameter in the discharge phase, and
  b) the first fraction of the first fuel component and the second fraction of the second fuel component in the fuel.

The introduction parameter and the discharge parameter are indicative of an introduction behavior and a discharge behavior, respectively, of the fuel components.

The internal combustion engine is in particular an Otto-cycle engine. The fuel that is used for the operation of the internal combustion engine may have gasoline and/or ethanol fractions.

The internal combustion engine has, for example, an intake tract in which a mixture of fuel and air is prepared. From the intake tract, which is formed in particular by way of an intake pipe, the fuel/air mixture is supplied to the internal combustion engine. Alternatively, in the case of an internal combustion engine operated with direct injection, it is also possible for the mixture preparation to take place for the first time in the cylinder (so-called direct injection). Fuel can pass into the intake tract for example via inflows (for example from the crankcase, the tank ventilation system etc.), but these are only temporary, temporally restricted processes. After the combustion of the fuel/air mixture in the internal combustion engine, the combustion exhaust gas is discharged from the internal combustion engine through an exhaust pipe. A lambda probe is arranged such that the respective residual oxygen content in the combustion exhaust gas can be measured, in order to measure from this the ratio of combustion air to unburned fuel. In a manner dependent on the ratio of combustion air to unburned fuel, a $\lambda$ value is calculated.

The housing or the crankcase of the internal combustion engine is filled with a lubricant (for example engine oil). The lubricant serves for the lubrication of a wide variety of systems of the internal combustion engine. Under certain ambient conditions (for example in the presence of certain values of the introduction parameters or of the discharge parameters), a mass flow of fuel is, in an undesired manner, introduced into or discharged (outgassed) out of the lubricant. Likewise, it is possible for example for water fractions of the fuel to be introduced into the lubricant as a result of condensation.

The introduction of the fuel into the lubricant leads to a dilution of the lubricant and to a deterioration of the lubricating action of the lubricant. On the other hand, in the presence of certain discharge parameters, an evaporation of the fuel dissolved in the lubricant occurs. Said evaporated fuel is normally conducted into the intake tract of the internal combustion engine and conducted through the internal combustion engine. In particular, the outgassing of the fuel and the subsequent introduction into the intake tract leads to an enrichment of the fuel/air mixture in the intake tract, and thus to a decrease in efficiency of the internal combustion engine, and to an increase in emissions. Furthermore, this results in misinterpretation of the measurements by the lambda probe in the exhaust-gas region of the internal combustion engine, which in turn can lead to erroneous setting of the fuel/air mixture.

With the present method, the composition of the mass flow of the fuel into (introduction) or out of (discharge) the lubricant is determined. Some fuel components of the fuel dilute the lubricant to a greater extent than other fractions of the fuel. Furthermore, some fuel components of the fuel have a better calorific value than other fractions. Thus, firstly, based on the fractions of the fuel components of the fuel introduced into the lubricant, the lubricating capability of the lubricant at a point in time can be better determined. Secondly, based on the fractions of the fuel components of the fuel discharged out of the lubricant into the intake tract, the fuel/air mixture in the intake tract can be set more precisely, and thus the running behavior of the internal combustion engine improved.

As explained in the introduction, firstly, the composition of a fuel is predefined. A fuel is for example gasoline or a particular ethanol-containing fuel (for example E10, E20, E50). Every fuel is composed for example of a multiplicity of different fuel components. The fuel components are for example divided into ethanol, high-volatility fuel components or low-volatility fuel components. Depending on which fuel the tank has been filled with, a mixture of a wide variety of fuel components is present in the intake tract of the internal combustion engine and/or in the cylinder. Low-volatility fuel components may be understood, for example, to mean toluene (boiling point approximately 111° C.) or 2-methylpropan-1-ol (boiling point approximately 111° C.) Below, low-volatility fuel components may be understood to mean, for example, fuel components with a boiling point of higher than approximately 75° C. High-volatility fuel components may for example be understood to mean tert-butyl methyl ether (boiling point approximately 55° C.), isopentane (boiling point approximately 28° C.) or methanol (boiling point approximately 65° C.). Below, high-volatility fuel components may be understood to mean, for example, fuel components with a boiling point lower than approximately 75° C.

Correspondingly, in an example embodiment, it is possible for at least the first fraction of the first fuel component (K1) or the second fraction of the second fuel component (K2) to define an ethanol content of the fuel, a water content of the fuel, a toluene content of the fuel, a 2-methylpropan-1-ol content of the fuel, tert-butyl methyl ether content of the fuel, isopentane content of the fuel and/or methanol content of the fuel, wherein the first fraction of the fuel differs from the second fraction of the fuel.

In addition to the type of fuel components in the fuel, the percentage fractions thereof in relation to the total amount of fuel in the initial state (for example in the tank of a motor vehicle) are also predefined. For example, a fuel (for example fuel type E20) may be composed of 80 wt % low-volatility and high-volatility fuel components and 20 wt % ethanol.

The composition of the fuel components of the fuel may be determined or predefined for example by way of a wide variety of fuel measurement methods.

In the method, the mass flow of the fuel, with which mass flow the fuel is introduced into the lubricant in an introduction phase or with which mass flow the fuel is discharged from the lubricant and from the housing in a discharge phase, is predefined. The mass flow may be predefined for example based on various operating states (for example cold start, idle operation etc.) of the internal combustion engine. Furthermore, environmental influences such as, for example, ambient temperatures, may be taken into consideration in the predefining of the mass flow.

In an example embodiment, the mass flow of the fuel into the lubricant or out of the lubricant is calculated.

The mass flow of the fuel into the lubricant or out of the lubricant corresponds approximately to the mass flow of the fuel into the housing or out of the housing. The mass flow is calculated from a difference between the fuel mass actually injected into the cylinder of the internal combustion engine and the stoichiometrically calculated fuel mass.

The fuel mass actually injected by way of the injectors into the intake pipe or into the cylinder of the internal combustion engine is known.

The stoichiometrically calculated fuel mass can be calculated as follows:

$$\text{stoichiometric fuel mass} = \lambda - SP*\text{minimum air mass}*\text{air mass}$$

The air mass supplied to the cylinder is known. The $\lambda$ value can be calculated from $$\lambda = \text{mass of fuel}/(\text{minimum air mass}*\text{air mass}).$$

The minimum air mass is known for the determined fuel (=stoichiometric factor (for example 9 for 100% ethanol; 14.7 for gasoline without ethanol).

$\lambda$ is determined by a setpoint in the system. The air mass is a measured value in the system.

Subsequently, the stoichiometric fuel mass can be subtracted from the injected fuel mass. The calculated difference can be interpreted as being the amount introduced into the crankcase (=mass flow).

In the case of the introduction phase, in which the fuel is introduced with the mass flow into the lubricant, at least one introduction parameter is defined, based on which an introduction behavior of the first fuel component and of the second fuel component can be determined. Based on the introduction behavior of the first fuel component and of the second fuel component for a particular value of the introduction parameter, the composition of the mass flow composed of the first mass flow of the first fuel component and of the second mass flow of the second fuel component can be determined.

The introduction parameter is for example either a temperature of the coolant of the internal combustion engine or a fuel temperature of the fuel, in particular in the intake tract of the internal combustion engine. If the introduction parameter is for example the temperature of the coolant, then it is the case in the presence of particularly low temperatures of the coolant as introduction parameter that, firstly, the first fuel component is introduced into the lubricant with a first introduction mass flow owing to its introduction behavior and the second fuel component is introduced into the lubricant with a second introduction mass flow owing to its introduction behavior, for example owing to condensation on the cylinder walls.

The magnitude of the first introduction mass flow and of the second introduction mass flow is in this case dependent on the condition or characteristics (boiling behavior, condensation behavior, viscosity etc.) of the fuel component. For example, in the case of a particular temperature of the coolant as introduction parameter, one fuel component (for example ethanol) is introduced into the lubricant while another fuel component (for example a high-volatility fuel component) is not yet introduced, but is introduced for example only in the presence of higher temperatures. Thus, in this example, the fraction of the first mass flow of the ethanol (as first fuel component) in the mass flow is greater than the fraction of the second mass flow of the low-volatility fuel component (as second fuel component) in the mass flow.

Correspondingly, a discharge parameter is defined, based on which a first discharge mass flow of the first fuel component and a second discharge mass flow of the second fuel component out of the lubricant can be determined, wherein the first and the second discharge mass flows form the total discharge mass flow. The discharge parameter is for example a temperature of the lubricant of the internal combustion engine or a fuel temperature of the fuel, in particular in the intake tract of the internal combustion engine.

If the discharge parameter is for example the temperature of the lubricant, then it is possible, above a particular temperature of the lubricant, for the first fuel component to be discharged with a first discharge mass flow from the lubricant and for the second lubricant component to be discharged with a second discharge mass flow from the lubricant, for example owing to outgassing.

The magnitude of the first discharge mass flow and of the second discharge mass flow and the fractions thereof in the (total discharge) mass flow are in this case dependent on the condition of the fuel component. For example, in the case of a particular temperature of the lubricant as discharge parameter, a first fuel component (for example ethanol at approximately 78° C.) is discharged for the first time at higher temperatures than a second fuel component (for example a high-volatility fuel component). Thus, at low lubricant temperatures, the fraction of the second mass flow of the second fuel component in the mass flow is in this example greater than the first fraction of the first mass flow of the first fuel component in the total mass flow.

Furthermore, the fuel may also have a third fuel component or a further multiplicity of fuel components, such that the corresponding third or a corresponding multiplicity of corresponding mass flows of the further fuel components can likewise be determined or calculated, as fractions of the total mass flow, by means of the above method.

In this context, it is pointed out that the introduction mass flows of the first fuel component and of the second fuel components each define the introduction and discharge mass at a particular time (g/s). By integration of the profile of the introduction mass flow or of the discharge mass flow over the particular time duration, it is possible to determine a corresponding first mass or second mass of the respective fuel components.

With the method, it is thus possible to determine the dilution of the lubricant with fuel at a particular point in time, and in particular the composition of the fuel with which the lubricant is diluted at a point in time. This has the effect, for example, that necessary service intervals of a motor vehicle in which the internal combustion engine is installed can be calculated in a flexible manner, for example in a manner dependent on the state (dilution state) of the lubricant in the housing. Furthermore, by means of the method, it is possible to determine the corresponding composition of a fuel in the lubricant and a corresponding composition of the fuel outgassed from the lubricant. This knowledge regarding the amount of fuel outgassed from the lubricant, and the composition of said fuel, makes it possible to more precisely set a fuel/air mixture in the intake tract of the internal combustion engine. In particular, because the first fraction of the first mass flow of the first fuel component and the second fraction of the second mass flow of the second fuel component out of the lubricant are known, it is possible to determine the potential for outgassing of the fuel from the lubricant and, correspondingly, to correspondingly correct the fuel/air mixture in the intake tract, into which a fuel outgassed from the lubricant is introduced.

In a further exemplary embodiment, it is possible, in addition to the selected introduction parameter, for an additional further introduction parameter to be determined, wherein, based on the introduction parameter and the further introduction parameter, the first introduction mass flow of the first fuel component and the second introduction mass flow of the second fuel component in the lubricant can be determined.

Correspondingly, in a further embodiment, a further discharge parameter can be selected. Based on the discharge parameter and the further discharge parameter, it is possible to determine the first discharge mass flow of the first fuel component and the second discharge mass flow of the second fuel component out of the lubricant.

Taking into consideration multiple introduction parameters or discharge parameters which are indicative of an introduction of the fuel components or of a discharge (outgassing) of the fuel components, respectively, the accuracy of the method can be increased.

With the present method, lubricant dilution with fuel is modeled correctly in a multi-component model. In this case, firstly, the fuel is divided into different fuel components, and the typical introduction behavior and corresponding discharge behavior of the individual fuel components are defined by way of introduction parameters and discharge parameters. In this way, the fractions of the fuel components in a total mass flow that is introduced into or discharged from the lubricant at a point in time can be determined.

The fuel temperature, the lubricant temperature (oil temperature) and/or the coolant temperature may be taken into consideration as introduction parameters or discharge parameters.

A total mass flow of the fuel that is introduced into the housing can be determined for example by comparison between an injection mass in the intake tract or cylinder and the fuel mass required for the combustion (present air mass flow determined, for example, from a pressure sensor or an air mass sensor). Influential factors such as lambda control, lambda adaptation values (additive lambda adaptation and multiplicative lambda addition) or the stoichiometry constants (variable owing to different fuel components) may be taken into consideration. Furthermore, information regarding the operating modes such as, for example, direct injection, intake pipe injection or the combination of the two injection variants, may be incorporated into the calculation of the mass flow.

With the present method, an introduction/discharge model of a fuel mass flow into a housing is modeled. As described below in the FIGURE, a characteristic map is modeled based on characteristic values of the various introduction and discharge parameters with regard to the fuel components. The modeled mass flow into the lubricant or out of the lubricant is dependent on the active fuel components and the respective inlet mass flows and outlet mass flows of the fuel components. Active fuel components are those fuel components which, at a particular point in time, in the presence of corresponding introduction and discharge parameters, are introduced into or discharged out of the lubricant.

Other embodiments provide a control device for an internal combustion engine of a motor vehicle is described, wherein the control device is configured such that the above-described method for determining a total mass of a fuel in a lubricant and/or the above-described method for operating an internal combustion engine can be carried out.

The control device may for example have a programmable process. Furthermore, the control unit may have a database in which there are stored, for example, data for the particular introduction parameters of particular fuel components, discharge parameters of particular fuel components, fuel compositions in the presence of particular air mass flows, predefined time periods and/or particular mass flows of the introduction of fuel into and/or discharge of fuel out of the lubricant, which data can be accessed by the processor. Furthermore, the database may have stored in it, as parameters, for example the control coordinates of the throttle flap or the ignition times of the internal combustion engine.

Furthermore, the control unit can automatically initiate the above-described method when suitable measurement conditions, for example idle running of the internal combustion engine, are present.

Other embodiments provide a computer program for determining a total mass of a fuel in a lubricant is described. The computer program is configured to carry out the above-described method when the computer program is executed by a processor.

In the context of this document, the reference to a computer program of said type equates to the concept of a program element, a computer program product and/or a computer-readable medium which comprises commands for controlling a computer system so as to coordinate the operation of a system or of a method in a manner suitable for realizing the effects associated with the disclosed method.

The computer program may be implemented in the form of computer-readable command code in any suitable programming language such as for example in Java, C++ etc. The computer program may be stored on a computer-readable storage medium (CD-ROM, DVD, Blu-ray disc, removable drive, volatile or non-volatile memory, installed memory/processor etc.). The command code can program a computer or other programmable units, in particular a control unit or the above-described control device for an internal combustion engine of a motor vehicle, such that the desired functions are realized. Furthermore, the computer program may be provided in a network, for example the Internet, from which it can be downloaded by a user as required.

Embodiments of the invention may be realized both by way of a computer program, that is to say an item of software, and by way of one or more specialized electrical circuits, that is to say in the form of hardware, or in any desired hybrid form, that is to say by way of software components and hardware components.

It is pointed out that the embodiments described here represent merely a limited selection of possible design variants. For example, it is possible for the features of individual embodiments to be combined with one another in a suitable manner, such that a multiplicity of different embodiments are to be regarded as being disclosed in an obvious manner to a person skilled in the art by the design variants explicitly specified here.

Identical or similar components are denoted by the same reference signs in the FIGURE. The illustration in the FIGURE is schematic and not to scale.

FIG. 1 shows a method for determining a composition of a fuel in a lubricant situated in a housing (for example a crankcase) of an internal combustion engine. FIG. 1 shows, for example, the profile with respect to time during a cold start of the internal combustion engine, wherein, during the warm-up, it is initially the case, still in an introduction phase, that a mass flow MFF of the fuel is introduced into the lubricant, and subsequently, as the warm-up of the internal combustion engine progresses, the introduced fuel evaporates out of the lubricant with the mass flow MFF in the discharge phase.

Firstly, the composition of a fuel is predefined. In the example of FIG. 1, the fuel has, for example, a first fuel component K1, a second fuel component K2 and a third fuel component K3.

Each fuel component K1, K2, K3 represents a constituent of the fuel, which constituents exhibit different levels of volatility. In the present example, as fuel, use is made of a fuel with an ethanol content of 50 wt % (corresponding to fuel type E50). The first fuel component K1 corresponds to the ethanol and thus makes up a fraction of 0.5 (50 wt %) of the total fuel amount. The second fuel component K2 corresponds, for example, to a low-volatility fuel fraction and makes up 30 wt % (a fraction of 0.3) of the total fuel amount. The third fuel component K3 corresponds, for example, to a high-volatility fuel fraction, and makes up 20 wt % (a fraction of 0.2) in the total fuel amount. The sum of the fractions of the fuel components K1, K2, K3 add up to 100 wt % or 1. In particular, each fuel component K1, K2, K3 exhibits particular condensation and boiling behaviors (that is to say introduction and discharge behaviors) that differ from one another.

Subsequently, the mass flow MFF of the fuel into the lubricant (introduction phase, left-hand half of the diagram in FIG. 1) and out of the lubricant (discharge phase, right-hand half of the diagram in FIG. 1) are determined.

Subsequently, an introduction parameter EP is selected, based on which it is determined when a fuel component K1, K2, K3 becomes active and thus forms an introduction mass flow m1E, m2E, m3E as a fraction of the mass flow MFF.

A fuel component K1, K2, K3 is active when it forms an introduction mass flow m1E, m2E, m3E or discharge mass flow m1A, m2A, m3A as a fraction of the mass flow MFF.

The introduction parameter EP is for example, as illustrated by way of example in FIG. 1, an introduction temperature TE (for example coolant temperature) of the coolant of the internal combustion engine. In the example of FIG. 1, the temperature of the coolant ranges for example from −40° to +40° (see the introduction phase on the left-hand side in FIG. 1). In other examples, the coolant temperature may indeed also reach higher temperatures. In this example, the activation temperatures of the fuel components K1, K2, K3 are selected, by way of example, in the range from approximately −40° C. to 40° C.

Furthermore, a discharge parameter AP, such as for example the temperature of the lubricant (for example of the engine oil), is selected. Based on the values or the temperature of the discharge parameter of the lubricant, or of the engine oil, it can be determined when a fuel component K1, K2, K3 becomes active in the discharge phase and thus forms a discharge mass flow m1A, m2A, m3A as a fraction of the mass flow MFF. In FIG. 1, the discharge temperature TA of the discharge parameter AP is illustrated on the right-hand side (discharge phase) in FIG. 1. The discharge temperature TA of the discharge parameter AP, such as for example the temperature of the lubricant, ranges for example from 20° C. to 80° C.

In FIG. 1, in particular, formulae for the calculation of the fractions of the introduction mass flows m1E, m2E and of the fractions of the discharge mass flows m1A, m2A in the mass flow MFF are presented along a particular profile with respect to time t. For better clarity, the formulae for the calculation of the introduction mass flow m3E and of the discharge mass flow m3A are not illustrated.

Before a first time range t1, while the coolant, as input parameter EP, warms from approximately TE=−40° C. to TE=−20° C., it is for example the case that only the first fuel component K1 is active. Active means that, in the temperature range of TE=−40° C. to −20° C., only the first fuel component K1 forms the mass flow MFF that is introduced into the lubricant. The corresponding first introduction mass flow m1E of the first fuel component K1 which is active before the first time range t1 and which is introduced into the lubricant can be calculated by way of the corresponding formula:

$$m1E(K1)=\Sigma(MFF \times 0.5/0.5)$$

The mass flow MFF is thus composed exclusively of the first fuel component K1, that is to say of ethanol in the present example.

The corresponding mass of the first fuel component K1 that has been introduced into the lubricant in a time range t can be calculated for example by integration of the first introduction mass flow m1E over the particular time range t.

In a first time range t1, in which the introduction temperature TE of the first introduction parameter EP (for example coolant) is between −20° C. and 40° C., the second component K2 likewise becomes active in addition to the first component K1, and is thus introduced with a particular second mass flow m2E into the lubricant. The fractions of the first introduction mass flow m1E of the first fuel component K1 and of the second introduction mass flow m2E of the second fuel component K2 in the total mass flow MFF is calculated for example by way of the following formulae:

$$m1E(K1)=\Sigma(MFF \times 0.5/0.8), \text{ and}$$

$$m2E(K2)=\Sigma(MFF \times 0.3/0.8).$$

The fractions of the active fuel components K1, K2 in the total fuel amount, that is to say the first fraction (0.5) of the first fuel component K1 and the second fraction (0.3) of the second fuel component, are taken into consideration in the calculation of the fractions of the introduction mass flows (m1E, m2E) in the mass flow MFF. Thus, the fraction of the first introduction mass flow m1E of the mass flow MFF is incorporated, said fraction being 0.5/0.8, wherein "0.5" represents the fraction of the first fuel component K1 in the fuel and "0.8" represents the fractions of the active fuel components K1, K2 (0.8=0.5 (=first fuel component K1)+ 0.3 (=second fuel component K2)).

In the event of a further increase of the introduction temperature TE of the introduction parameter EP (for example of the coolant) above 40° C., the third fuel component K3 also becomes active in the second time range t2. The fractions of the introduction mass flows m1E, m2E, m3E in the mass flow MFF thus corresponds to the fractions of the individual fuel components K1 (=0.5), K2 (=0.3), K3 (=0.2) in the fuel. For example, the fractions of the introduction mass flows m1E, m2E, m3E in the mass flow MFF into the lubricant are now calculated by means of the following formulae:

$$m1E(K1) = \Sigma(MFF \times 0.5/1.0),$$

$$m2E(K2) = \Sigma(MFF \times 0.3/1.0), \text{ and}$$

$$m3E(K3) = \Sigma(MFF \times 0.2/1.0).$$

For better clarity, the introduction and discharge mass flows, or the formulae thereof, have not been plotted in the second time range t2 or in the third time range t3 in FIG. 1.

The masses of the individual fuel components K1, K2, K3 introduced into the lubricant can be calculated by integration of the individually calculated introduction mass flows m1E, m2E, m3E over a particular period of time. Addition of the individual calculated masses of the fuel components K1, K2, K3, or addition of the individual introduction mass flows m1E, m2E, m3E, yields the mass flow MFF (illustrated by the dashed lines in FIG. 1).

Correspondingly, it is possible to calculate the discharge mass flows m1A, m2A, m3A as fractions of the (discharge) mass flow MFF in the discharge phase.

In FIG. 1, the discharge phase is illustrated in the right-hand half. The individual graphs show the discharge mass flows m1A, m2A, m3A of the individual fuel components K1, K2, K3 out of the lubricant and the total discharge of the mass flow MFF (dashed line). The mass flow MFF in the discharge phase, and correspondingly the discharge mass flows m1A, m2A, m3A, describe the decrease of the fuel component dissolved in the lubricant during the discharge phase. At the end of the fourth time period t4, all of the fuel has been discharged, and the mass flow and the associated discharge mass flows m1A, m2A, m3A, are zero.

At the start of the discharge phase, a maximum mass of the fuel components K1, K2, K3 is present in the lubricant. The discharge parameter AP is for example the temperature of the lubricant (for example of the engine oil in the crankcase).

In a range in which the discharge temperature TA is below 20° C., the fuel components K1, K2, K3 remain passive and remain dissolved in the lubricant. After the temperature threshold of TA=20° C. is overshot, the discharge of the fuel component K3 (K3=active) begins during a third time period t3. The discharged mass flow MFF is thus composed exclusively of the third discharge mass flow m3A.

Up to a discharge temperature TA of 60° C., fuel component K2 remains passive, wherein, after the temperature threshold TA=60° C. is overshot, the discharge of fuel component K2 begins. However, since the third fuel component K3 has already been fully outgassed or discharged, the discharged mass flow MFF is, between TA=60° C. and 80° C., composed exclusively of the second discharge mass flow m2A (only fuel component K2 is active).

Up to a discharge temperature TA of 80° C., fuel component K1 remains passive. The discharge of fuel component K1 begins after the discharge temperature TA=80° C. is overshot. In this example, in the fourth time range t4, at a discharge temperature TA of 80° C., the fuel components K2 and K3 are active simultaneously, as the third fuel component K3 has already been discharged.

In a general formula, it is for example possible for the discharge mass flow for the active components to be calculated as follows:

$$MXA(X2) = \Sigma(MFF \times \text{fraction } X \text{ in the fuel}/\Sigma(\text{active } K1,K2,K3))$$

For example, in a temperature range of the discharge temperature TA above 80° C., only the first fuel component K1 and the second fuel component K2 are active. The third fuel component K3 has already been fully outgassed from the lubricant. In this range, it is for example the case that, during the fourth time period t4, the fractions of the first discharge mass flow m1A and of the second discharge mass flow m2A in the mass flow MFF are calculated by way of the following formulae. In general, the following formulae apply for the calculation of the discharge mass flows m1A, m2A, m3A:

$$m1A(K1) = MFF^* (\text{mass } K1/\Sigma\text{mass}(\text{active } K1,K2,K3)),$$

$$m2A(K2) = MFF^* (\text{mass } K2/\Sigma\text{mass}(\text{active } K1,K2,K3)),$$

$$m3A(K3) = MFF^* (\text{mass } K3/\Sigma\text{mass}(\text{active } K1,K2,K3)).$$

The discharge phase ends at the time at which each of the fuel components K1, K2, K3 has been fully outgassed from the lubricant.

The mass of outgassed fuel of the respective fuel components K1, K2, K3 can be calculated by integration of the corresponding discharge mass flows m1A, m2A, m3A over the particular time period, for example the third or fourth time period t3, t4.

With the methods illustrated in FIG. 1, it is thus possible for the fraction of the respective fuel components K1, K2, K3 in the mass flow MFF to be calculated at a particular point in time t and in a manner dependent on a particular profile of the corresponding introduction parameters EP or the discharge parameters AP. Furthermore, it is possible to calculate two, three or a multiplicity of different mass flows of fuel components that make up fractions of a mass flow of the fuel.

For example, building on the method illustrated in FIG. 1 for determining the respective fuel mass in the lubricant, a further, second method may be implemented, based on which a fuel correction of the fuel/air mixture in the intake tract of the internal combustion engine can be performed, as it is possible to better predict the composition that the mass flow which is outgassed from the crankcase has in the intake tract.

The respective fractions of the fuel components K1, K2, K3 are divided into high-volatility, medium-volatility and low-volatility constituents. It is thus possible to determine which fuel components K1, K2, K3 dilute the lubricant and which are outgassed. It is thus also possible to prevent surprise effects such as, for example, a sudden outgassing of an ethanol-containing fuel component K1.

It is thus possible, in turn, to more accurately determine the lubrication action of the lubricant, also with regard to non-volatile fuel components which permanently dilute the lubricant. This in turn permits component-specific determination of outgassing. Owing to the possibility of determining the amount of outgassed fuel from the lubricant that is vented into the intake tract, it is possible to prevent an overenrichment of the fuel/air mixture in the intake tract, such that undesired stalling of the internal combustion engine can be better prevented.

Additionally, it is pointed out that "comprising" does not exclude other elements or steps, and "a" or "an" does not rule out a plurality. Furthermore, it is pointed out that features or steps that have been described with reference to one of the above exemplary embodiments may also be used in combination with other features or steps of other exemplary embodiments described above.

LIST OF REFERENCE SIGNS

K1 First fuel component
K2 Second fuel component
K3 Third fuel component
EP Introduction parameter
AP Discharge parameter
TE Introduction temperature of the introduction parameter
TA Discharge temperature of the discharge parameter
t1 First time range
t2 Second time range
t3 Third time range
t4 Fourth time range
m1E Introduction mass flow [g/s] of the first fuel component into the lubricant
m2E Introduction mass flow [g/s] of the second fuel component into the lubricant
m3E Introduction mass flow [g/s] of the third fuel component into the lubricant
m1A Discharge mass flow [g/s] of the first fuel component out of the lubricant
m2A Discharge mass flow [g/s] of the second fuel component out of the lubricant
m3A Discharge mass flow [g/s] of the third fuel component out of the lubricant
MFF (Mass Fuel Flow) Total mass flow of the fuel caused to flow into the housing

What is claimed is:

1. A method for controlling fuel injection in an internal combustion engine based on determining a composition of a fuel in a lubricant situated in a housing of an internal combustion engine, the method comprising:
   predefining a composition of a fuel including: at least a first fraction of a first fuel component; second fraction of a second fuel component; and a water fraction of the fuel,
   the first fuel component and the second fuel component selected from the group consisting of: an ethanol content of the fuel, a total of high-volatility fuel components with a boiling point lower than approximately 75 degrees C., or a total of low-volatility fuel components with a boiling point higher than approximately 75 degrees C.,
   determining a mass flow of the fuel introduced into the lubricant in an introduction phase or discharged from the lubricant in a discharge phase,
   determining a composition of the mass flow which includes: a first mass flow of the first fuel component; second mass flow of the second fuel component; and a third mass flow of the water fraction, including determining a first mass flow fraction of the first mass flow of the first fuel component; a second mass flow fraction of the second mass flow of the second fuel component; and a third mass flow fraction of the water fraction of the fuel, based on:
      (a) an introduction parameter in the introduction phase or a discharge parameter in the discharge phase, and
      (b) the first fraction of the first fuel component; the second fraction of the second fuel component in the fuel; and the water fraction of the fuel, and
   adjusting one or more fuel injection parameters based at least in part the first mass flow fraction; the second mass flow fraction; and the third mass flow fraction.

2. The method of claim 1, wherein determining the mass flow of the fuel into the lubricant or out of the lubricant includes:
   determining a stoichiometric fuel ratio of the fuel,
   determining a fuel mass of the fuel injected into the internal combustion engine, and
   calculating the mass flow of the fuel based on the stoichiometric fuel ratio of the fuel and the injected fuel mass.

3. The method of claim 1, wherein the introduction parameter is a temperature of a coolant of the internal combustion engine or a fuel temperature of the fuel.

4. The method of claim 1, comprising selecting a further introduction parameter, wherein, based on the introduction parameter and the further introduction parameter, a first introduction mass flow of the first fuel component and a second introduction mass flow of the second fuel component into the lubricant are determined.

5. The method of claim 1, wherein the discharge parameter is the temperature of the lubricant.

6. The method of claim 1, further comprising selecting a further discharge parameter, wherein, based on the discharge parameter and the further discharge parameter, a first discharge mass flow of the first fuel component and a second discharge mass flow of the second fuel component out of the lubricant are determined.

7. A method for operating an internal combustion engine, the method comprising:
   predefining a composition of a fuel including at least: a first fraction of a first fuel component; a second fraction of a second fuel component; and a water fraction of the fuel,
   the second fuel component selected from the group consisting of: a toluene content of the fuel, a 2-methylpropan-1-ol content of the fuel, a tert-butyl methyl ether content of the fuel, an isopentane content of the fuel, a methanol content of the fuel, a total of high-volatility fuel components with a boiling point lower than approximately 75 degrees C., or a total of low-volatility fuel components with a boiling point higher than approximately 75 degrees C.,
   determining a mass flow of the fuel introduced into the lubricant in an introduction phase or discharged from the lubricant in a discharge phase,
   determining a composition of the mass flow which includes a first mass flow of the first fuel component; a second mass flow of the second fuel component; and a third mass flow of the water fraction, including determining a first mass flow fraction of the first mass flow of the first fuel component; a second mass flow fraction of the second mass flow of the second fuel component; and a third mass flow fraction of the water fraction of the fuel, based on:
      (a) an introduction parameter in the introduction phase or a discharge parameter in the discharge phase, and
      (b) the first fraction of the first fuel component; the second fraction of the second fuel component in the fuel; the water fraction of the fuel; and setting a fuel/air mixture in an intake tract of the internal combustion engine based on the mass flow of the fuel,
   controlling the fuel/air ratio to adjust the fuel injection in the internal combustion engine based on the composition of the mass flow.

8. A control device for an internal combustion engine of a motor vehicle, the control device comprising:
   a processor; and computer instructions stored in non-transitory computer-readable media and executable by the processor to determine a composition of a fuel in a lubricant situated in a housing of the internal combustion engine by a process including:

predefining a composition of a fuel including at least: a first fraction of a first fuel component; a second fraction of a second fuel component; and a water fraction of the fuel, the second fuel component selected from the group consisting of: a toluene content of the fuel, a 2-methylpropan-1-ol content of the fuel, a tert-butyl methyl ether content of the fuel, an isopentane content of the fuel, a methanol content of the fuel, a total of high-volatility fuel components with a boiling point lower than approximately 75 degrees C., or a total of low-volatility fuel components with a boiling point higher than approximately 75 degrees C., determining a mass flow of the fuel introduced into the lubricant in an introduction phase or discharged from the lubricant in a discharge phase, determining a composition of the mass flow which includes a first mass flow of the first fuel component; second mass flow of the second fuel component; and a third mass flow of the water fraction, including determining a first mass flow fraction of the first mass flow of the first fuel component; a second mass flow fraction of the second mass flow of the second fuel component; and a third mass flow fraction of the water fraction of the fuel, based on:

(a) an introduction parameter in the introduction phase or a discharge parameter in the discharge phase, and (b) the first fraction of the first fuel component; the second fraction of the second fuel component in the fuel; and the water fraction of the fuel, and adjusting fuel injection parameters based at least in part of the first mass flow fraction; the second mass flow fraction; and the third mass flow fraction.

9. The control device of claim 8, wherein determining the mass flow of the fuel into the lubricant or out of the lubricant includes:

determining a stoichiometric fuel ratio of the fuel, determining a fuel mass of the fuel injected into the internal combustion engine, and calculating the mass flow based on the stoichiometric fuel ratio of the fuel and the injected fuel mass.

10. The control device of claim 8, wherein the introduction parameter is a temperature of a coolant of the internal combustion engine or a fuel temperature of the fuel.

11. The control device of claim 8, wherein the computer instructions are further executable to select a further introduction parameter, and based on the introduction parameter and the further introduction parameter, determine a first introduction mass flow of the first fuel component and a second introduction mass flow of the second fuel component into the lubricant.

12. The control device of claim 8, wherein the discharge parameter is the temperature of the lubricant.

13. The control device of claim 8, wherein the computer instructions are further executable to select a further discharge parameter, and based on the discharge parameter and the further discharge parameter, determine a first discharge mass flow of the first fuel component and a second discharge mass flow of the second fuel component out of the lubricant.

14. The control device of claim 8, further comprising computer instructions configured to set a fuel/air mixture in an intake tract of the internal combustion engine based on the mass flow of the fuel, wherein the composition of the mass flow is taken into consideration in the setting of the fuel/air mixture in the intake tract.

* * * * *